United States Patent
Yu

(10) Patent No.: US 8,605,372 B2
(45) Date of Patent: Dec. 10, 2013

(54) VOICE COIL MOTOR AND LENS MODULE INCLUDING SAME

(75) Inventor: Hsiang-Chieh Yu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/535,701

(22) Filed: Jun. 28, 2012

(65) Prior Publication Data

US 2013/0170052 A1    Jul. 4, 2013

(30) Foreign Application Priority Data

Dec. 29, 2011    (TW) .............................. 100149476 A

(51) Int. Cl.
    *G02B 7/02*    (2006.01)
(52) U.S. Cl.
    USPC ......................................................... 359/813
(58) Field of Classification Search
    USPC ................................. 359/813–815, 822–830
    See application file for complete search history.

(56) References Cited

U.S. PATENT DOCUMENTS

| | | | |
|---|---|---|---|
| 2010/0080545 A1* | 4/2010 | Fan et al. | 396/55 |
| 2012/0008221 A1* | 1/2012 | Min et al. | 359/824 |

* cited by examiner

*Primary Examiner* — Scott J Sugarman
*Assistant Examiner* — Mustak Choudhury
(74) *Attorney, Agent, or Firm* — Altis Law Group, Inc.

(57) ABSTRACT

A voice coil motor includes a case, a moving barrel, magnetic elements, a lower plate, an elastic plate, a first and a second coil assemblies. The case includes an upper plate and a sidewall extending downward from peripheral edges of the upper plate. The upper plate and the sidewall cooperatively define a receiving room. The moving barrel is received in the receiving room. The magnetic elements are received in the receiving room and surround the moving barrel. The lower plate is positioned on one end of the sidewall. The elastic plate is connected between the upper plate and the moving barrel or between the lower plate and the moving barrel. The first coil assembly includes pairs of coils. Each pair of the coils is opposite to each other and attached on the moving barrel. The second coil assembly is annular shaped and sleeved over the moving barrel.

9 Claims, 6 Drawing Sheets

VOICE COIL MOTOR AND LENS MODULE INCLUDING SAME

BACKGROUND

1. Technical Field

The present disclosure relates to voice coil motors (VCMs) and, particularly, to a lens module including a VCM.

2. Description of Related Art

Many lens modules include a lens, a VCM, and an image sensor module. The lens is movably received in the VCM. The VCM is positioned on the image sensor module and drives the lens to move relative to the image sensor module to focus or anti shake. The structure used for focusing is generally independent of the structure used for shaking correction, which resulted that the structure of the VCM is complex.

Therefore, it is desirable to provide a lens module, which can overcome the limitations described.

DETAILED DESCRIPTION

Embodiments of the disclosure will be described with reference to the drawings.

Figure 1:
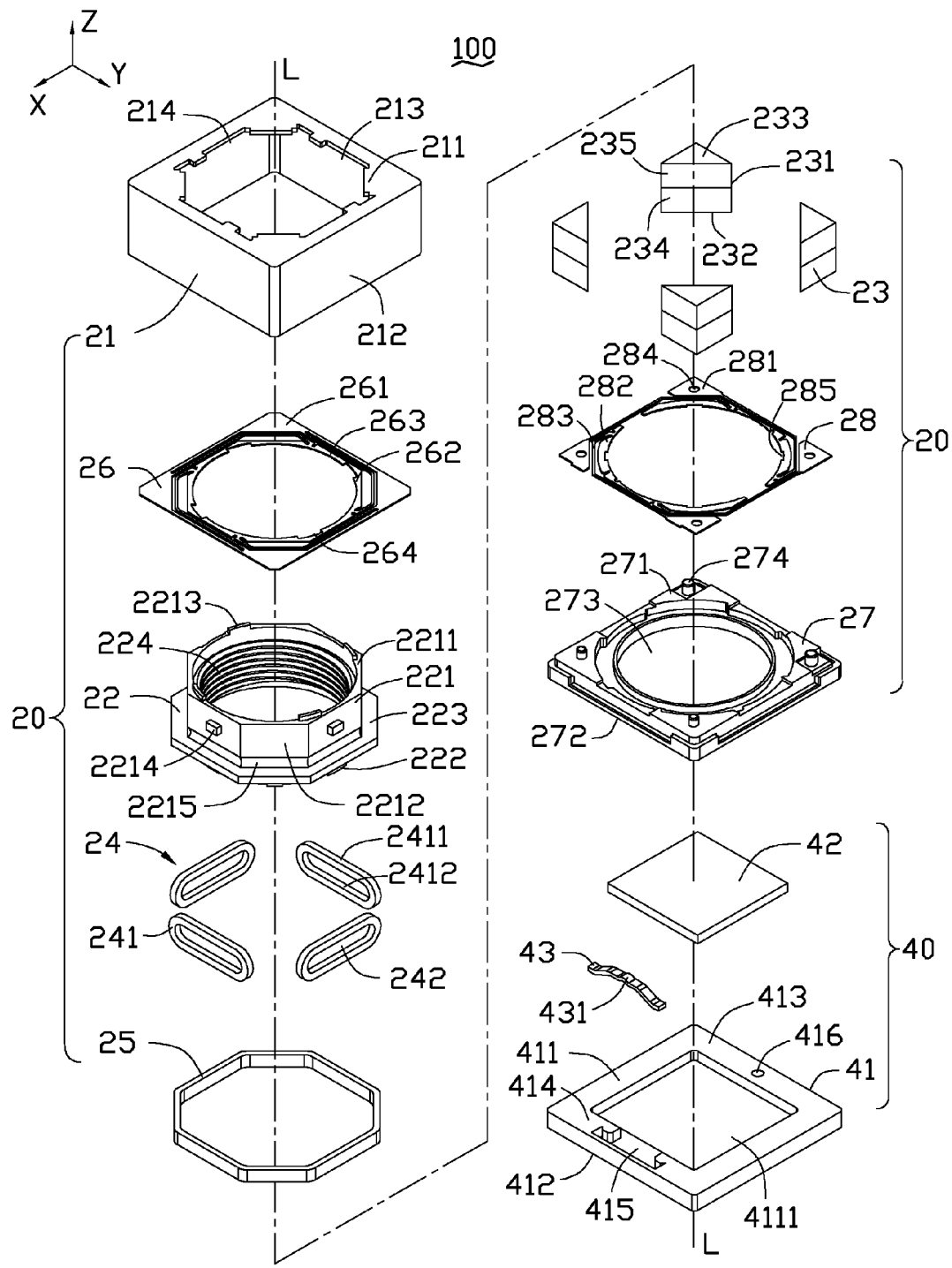
FIG. 1 is an isometric, exploded, and schematic view of a lens module in accordance with an exemplary embodiment.
Figure 2:
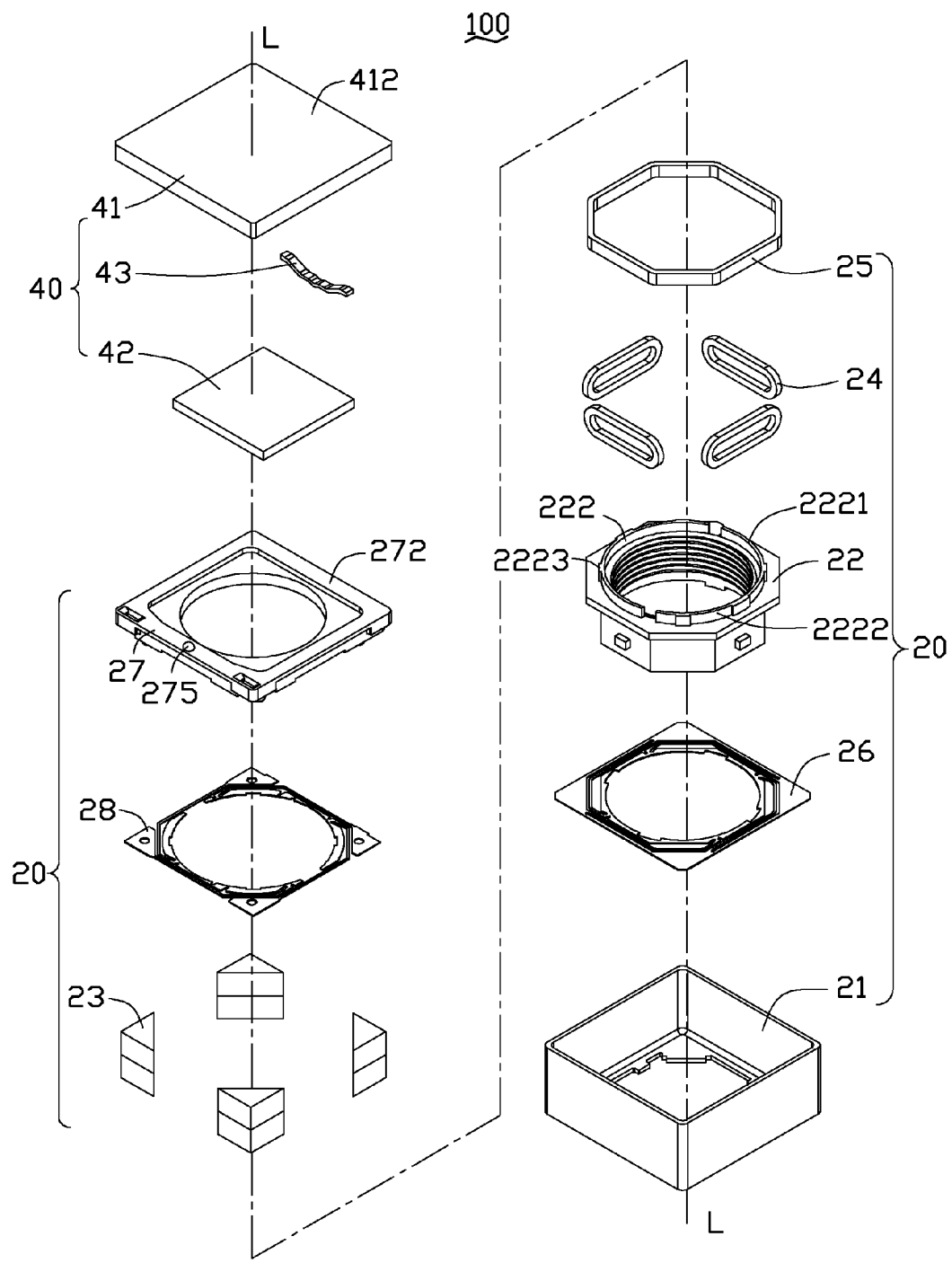
FIG. 2 is similar to FIG. 1, but viewed from another angle.
Figure 3:
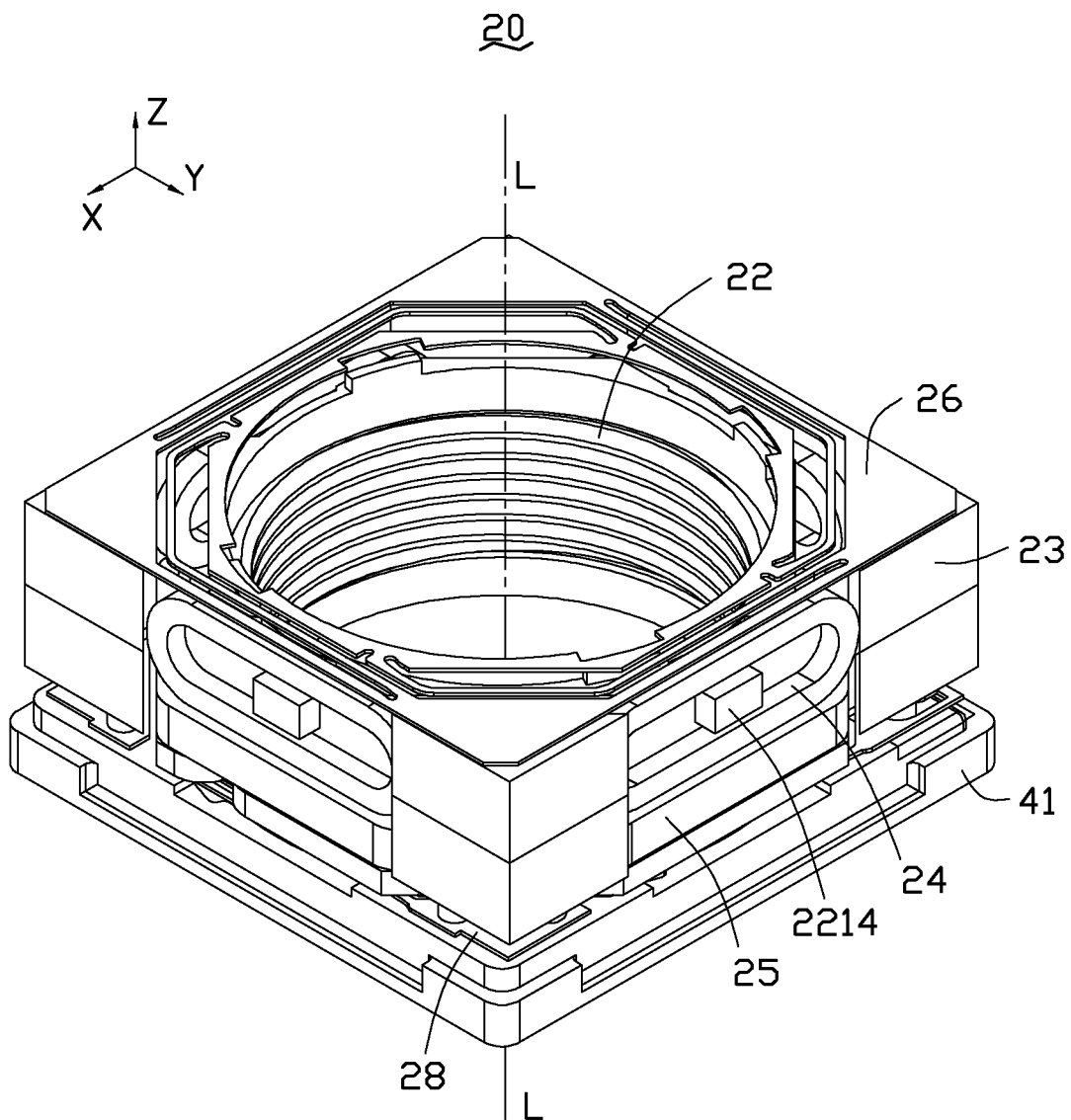
FIG. 3 is an assembled view of a VCM of the lens module of FIG. 1.

FIGS. 1-3, illustrate a lens module 100, according to an exemplary embodiment, has an optical axis L. The lens module 100 includes a VCM 20 and an image sensor module 40. A lens (not shown) is received in the VCM 20, and the VCM 20 drives the lens to move along the optical axis L or incline on a plane perpendicular to the optical axis L. When building a coordinate, the optical axis L serves as a Z-axis and the plane perpendicular to the optical axis L serves as an X-Y plane, the X-Y plane includes an X-axis perpendicular to the Z-axis and a Y-axis perpendicular to the Z-axis and the X-axis.

The VCM 20 includes a case 21, a moving barrel 22, a magnet assembly 23, a first coil assembly 24, a second coil assembly 25, a first elastic plate 26, a lower plate 27, and a second elastic plate 28.

The case 21 has a cubic configuration and includes an upper plate 211 and a sidewall 212 substantially perpendicularly extending downward from peripheral edges of the upper plate 211. The upper plate 211 and the sidewall 212 cooperatively define a receiving room 213. The upper plate 211 defines a first through hole 214 communicating with the receiving room 213, generally positioned at a central portion of the upper plate 211. In this embodiment, the sidewall 212 includes four plates connected to each other.

The moving barrel 22 is an octagonal prism and is moveably received in the receiving room 213. The lens is received in the moving barrel 22. The moving barrel 22 includes a first barrel portion 221, a second barrel portion 222, and a shielding plate 223 positioned between the first barrel portion 221 and the second barrel portion 222. The cross sectional area of the shielding plate 223 is greater than that of the first barrel portion 221 and the second barrel portion 222. The shielding plate 223 cooperates with the case 21 to prevent the electromagnetic interference to the image sensor module 40. The first barrel portion 221 includes an upper surface 2211 and a first outer surface 2212 connected to the upper surface 2211. The second barrel portion 222 includes a lower surface 2221 and a second outer surface 2222 connected to the lower surface 2221. The moving barrel 22 defines a lens hole 224 extending through the upper surface 2211 and the lower surface 2221.

A number of first connection blocks 2213 extend upward from the upper surface 2211 in a direction parallel to the optical axis L, generally surrounding the lens hole 224. The intervals between any two adjacent first connection blocks 2213 are equal. A number of position blocks 2214 extend outward from the first outer surface 2212 in circumference, adjacent to the upper surface 2211. The intervals between any two adjacent position blocks 2214 are equal. In this embodiment, the first outer surface 2212 includes eight sidewalls connected with each other. The number of the position blocks 2214 is four, two adjacent position blocks 2214 are spaced by one sidewall of the first outer surface 2212. The extending direction of two position blocks 2214 is parallel with the X-axis, and the extending direction of the other two position blocks 2214 is parallel with the Y-axis. The first outer surface 2212 defines a first recess 2215 in circumference. The first recess 2215 is generally adjacent to the shielding plate 223. A number of second connection blocks 2223 extend outward from the second outer surface 2222 in circumference. The intervals between two adjacent second connection blocks 2223 are equal. In this embodiment, the numbers of the first connection block 2213 and the second connection block 2223 are respectively four.

The magnet assembly 23 includes a number of magnetic elements 231 received in the receiving room 213. Each of the magnetic elements 231 is triangular prism shaped. In this embodiment, the number of the magnetic elements 231 is four, and the four magnetic elements 231 are respectively positioned at the corners of the case 21. The magnetic elements 231 are connected to the sidewall 212 of the case 21 by glue (not shown). Each of the magnetic elements 231 includes a first magnet 232 and a second magnet 233 staked on the first magnet 232. The first magnet 232 includes a first magnet surface 234 facing the optical axis L, and the second magnet 233 includes a second magnet surface 235 facing the optical axis L. The polarities of the first magnet surface 234 and the second magnet surface 235 are opposite. In this embodiment, the first magnet surface 234 is S-polarity, while the second magnet surface is N-polarity. The shape of the first magnet 232 and the second magnet 233 can be other shapes according to the shape and size of the receiving room 213.

The first coil assembly 24 includes a number of coils 241, each of the coils 241 is annular shaped and defines a position hole 242. Each of the coils 241 is positioned on the first outer surface 2212 of the moving barrel 22 with the position hole 242 receiving one of the position blocks 2214. In the illustrated embodiment, the number of the coils 241 is four. Two of the coils 241 are perpendicular with the X-axis, and the other two coils 241 are parallel with the Y-axis. Each of the coils 241 includes an upper portion 2411 and a lower portion 2412 parallel with the upper portion 2411. When a current flows in the coil 241, the current directions of the upper portion 2411 and the lower portion 2412 are opposite.

The second coil assembly 25 is annular shaped and received in the first recess 2215 of the moving barrel 22. The second coil assembly 25 and the first coil assembly 24 are spaced from each other. The first coil assembly 24 and the second coil assembly 25 can be supplied with current at the same time or at different times.

The first elastic plate 26 is washer shaped and connected between the upper plate 211 and the moving barrel 22. The first elastic plate 26 includes a first outer portion 261, a first inner portion 262, and a first connection portion 263 connected between the first outer portion 261 and the first inner portion 262. The first outer portion 261 is attached on a lower surface of the upper plate 211 by glue. The first inner portion 262 defines a number of first connection holes 264. The first connection blocks 2213 of the moving barrel 22 are received in the first connection holes 264, and the first connection blocks 2213 and the first inner portion 262 are connected by glue. In this embodiment, the number of the first connection holes 264 is four.

The lower plate 27 is square shaped and includes a first surface 271 and a second surface 272 opposite to the first surface 271. The lower plate 27 defines a second through hole 273 extending through the first surface 271 and the second surface 272. A number of connection poles 274 extend upward from the first surface 271, generally positioned at the corners of the first surface 271. The lower plate 27 defines a guiding hole 275 on the second surface 272, generally adjacent to an edge of the second surface 272. In this embodiment, the guiding hole 275 is a hemisphere shaped, blind hole (see FIG. 6). The number of the connection poles 274 is four.

The second elastic plate 28 is washer shaped and connected between the lower plate 27 and the moving barrel 22. The second elastic plate 28 includes a second outer portion 281, a second inner portion 282, and a second connection portion 283 connected between the second outer portion 281 and the second inner portion 282. The second outer portion 281 defines a number of second connection holes 284, generally positioned at corners of the second outer portion 281. The connection poles 274 of the lower plate 27 are received in the second connection holes 284, and the connection poles 274 and the second outer portion 281 are connected by glue. The second inner portion 282 defines a number of third connection holes 285. The second connection blocks 2223 of the moving barrel 22 are received in the third connection holes 285, and the second connection blocks 2223 and the second inner portion 282 are connected by glue. In this embodiment, the numbers of the second connection holes 284 and the third connection holes 285 are respectively four.

In order to decrease the cost of the lens module 100, the VCM 20 only includes the first elastic plate 26 or the second elastic plate 28.

During assembling the VCM 20, the first outer portion 261 of the first elastic plate 26 is connected to the case 21, and then the magnet assembly 23 is received in the receiving room 213 and fixed at corners of the case 21. The first coil assembly 24 and the second coil assembly 25 are respectively fixed on the moving barrel 22, and the assembled moving barrel 22 is received in the receiving room 213. The first inner portion 262 of the first elastic plate 26 is connected with the moving barrel 22. The magnetic elements 231 of the magnet assembly 23 surround the moving barrel 22. The lower portion 2412 of the coil 241 adjacent to the lower plate 27 faces the first magnet surface 234, and the upper portion 2411 of the coil 241 adjacent to the upper plate 211 faces the second magnet surface 235. The second inner portion 282 of the second elastic plate 28 is connected with the moving barrel 22, and the second outer portion 281 of the second elastic plate 28 is connected with the lower plate 27. The lower plate 27 is connected with the case 21 by glue. The moving barrel 22 is suspended in the receiving room 213 by the first elastic plate 26 and the second elastic plate 28. The moving barrel 22 can be driven to move along the optical axis L or incline on a plane perpendicular to the optical axis L by the magnet assembly 22. In an initial state, the optical axes of the first through hole 214, the lens hole 224, and the second through hole 273 are collinear.

During the process of shaking correction, as the upper portion 2411 and the lower portion 2412 of the coil 241 face the opposite polarity magnet, when one of the coils 241 perpendicular to the X-axis is supplied with a forward current (clockwise direction), the coil 241 is given a first Lorentz force along the positive Z-axis. At same time, the other coil 241, perpendicular to the X-axis is supplied with a reverse current (counterclockwise direction), the coil 241 is given a second Lorentz force along the negative Z-axis. Therefore, the moving barrel 22 is driven to incline to the positive X-axis. When the current direction of the two coils 241 perpendicular to the X-axis is changed, the moving barrel 22 is driven to incline to the negative X-axis. Likewise, the two coils 241 perpendicular to the Y-axis are supplied with a forward current and a reverse current, the moving barrel 22 is driven to incline to the positive Y-axis or the negative Y-axis.

During the process of focusing, as the second coil assembly 25 is surrounded by the first magnet surfaces 234, when the second coil assembly 25 is supplied with a forward current or a reverse current, the second coil assembly 25 is given a Lorentz force along the positive Z-axis or the negative Z-axis. Therefore, the moving barrel 22 is driven to move along the positive Z-axis or the negative Z-axis.

Figure 4:
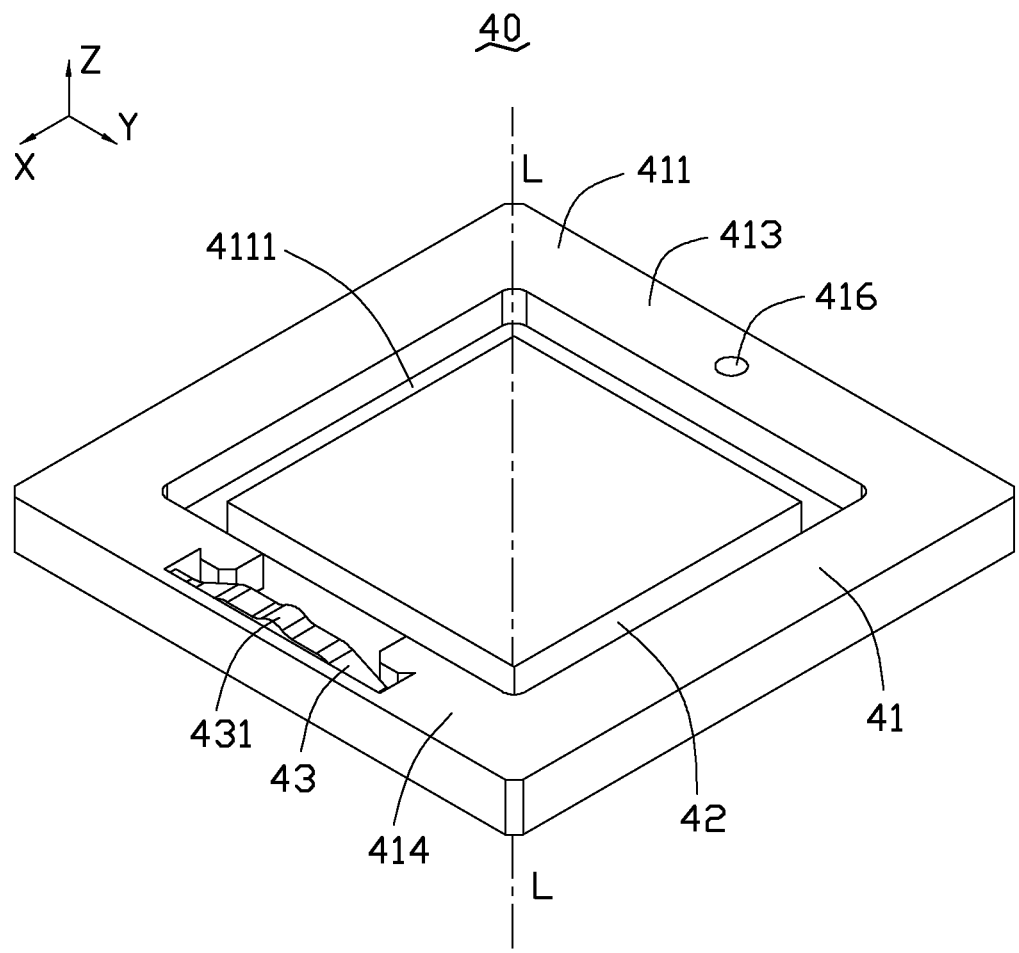
FIG. 4 is an assembled view of an image sensor module of the lens module of FIG. 1.

FIG. 4, shows the image sensor module 40 including a seat 41, an image sensor 42, and at least one elastic element 43. The seat 41 is square and includes a top surface 411 and a bottom surface 412 opposite to the top surface 411. The seat 41 defines a second recess 4111 on the top surface 411, generally at the center of the top surface 411. The shape of the second recess 4111 corresponds to that of the image sensor 42, and the second recess 4111 is configured to receive the image sensor 42. The top surface 411 is a smooth surface and is divided into a first portion 413 and a second portion 414. The distance between the first portion 413 and the bottom surface 412 is not less than the distance between the second portion 414 and the bottom surface 412. In this embodiment, the first portion 413 and the second portion 414 are two opposite edges of the seat 41. The top surface 411 and the bottom surface 412 form an acute angle facing the edge adjacent to the first portion 413. The seat 41 defines a notch 415 communicating with the second recess 4111, on the second portion 413.

The elastic element 43 is received in the notch 415, and part of the elastic element 43 protrudes out of the notch 415. The distance between the part of the elastic element 43 protruding out of the notch 415 and the bottom surface 412 is greater than the distance between the first portion 413 and the bottom surface 412. In this embodiment, the elastic element 43 is strip shaped. After a pressure has been exerted on the elastic element 43, the middle of the elastic element 43 protrudes out of the notch 415 and forms a supporting protrusion 431. The distance between the supporting protrusion 431 and the bottom surface 412 is greater than the distance between the first portion 413 and the bottom surface 412. A guiding protrusion 416 corresponding to the guiding hole 275 extends upward from the first portion 413. The guiding protrusion 416 is hemisphere shaped.

The elastic element 43 can be other shapes, such as triangular shaped. The image sensor module 40 can include two or three elastic elements 43. When the three elastic elements 43 are positioned on the top surface 411, and the highest point of the elastic elements 43 form a supporting surface. The supporting surface can be adjusted to be parallel with the X-Y surface by adjusting the height of the one or two elastic elements 43.

The image sensor 42 is received in the second recess 4111 of the seat 41, and includes an image surface parallel with the X-Y surface. The image sensor 42 converts the light rays projected on the image surface to electrical signals.

During the process of assembling the image sensor module 40, the elastic element 43 is fixed in the notch 415 by glue. The supporting protrusion 431 protrudes from the second portion 414. When a pressure is applied on the supporting protrusion 431, the supporting protrusion 431 moves toward the bottom surface 412. The image sensor 42 is electrically connected with the seat 41 by wire bond or die bond.

Figure 5:
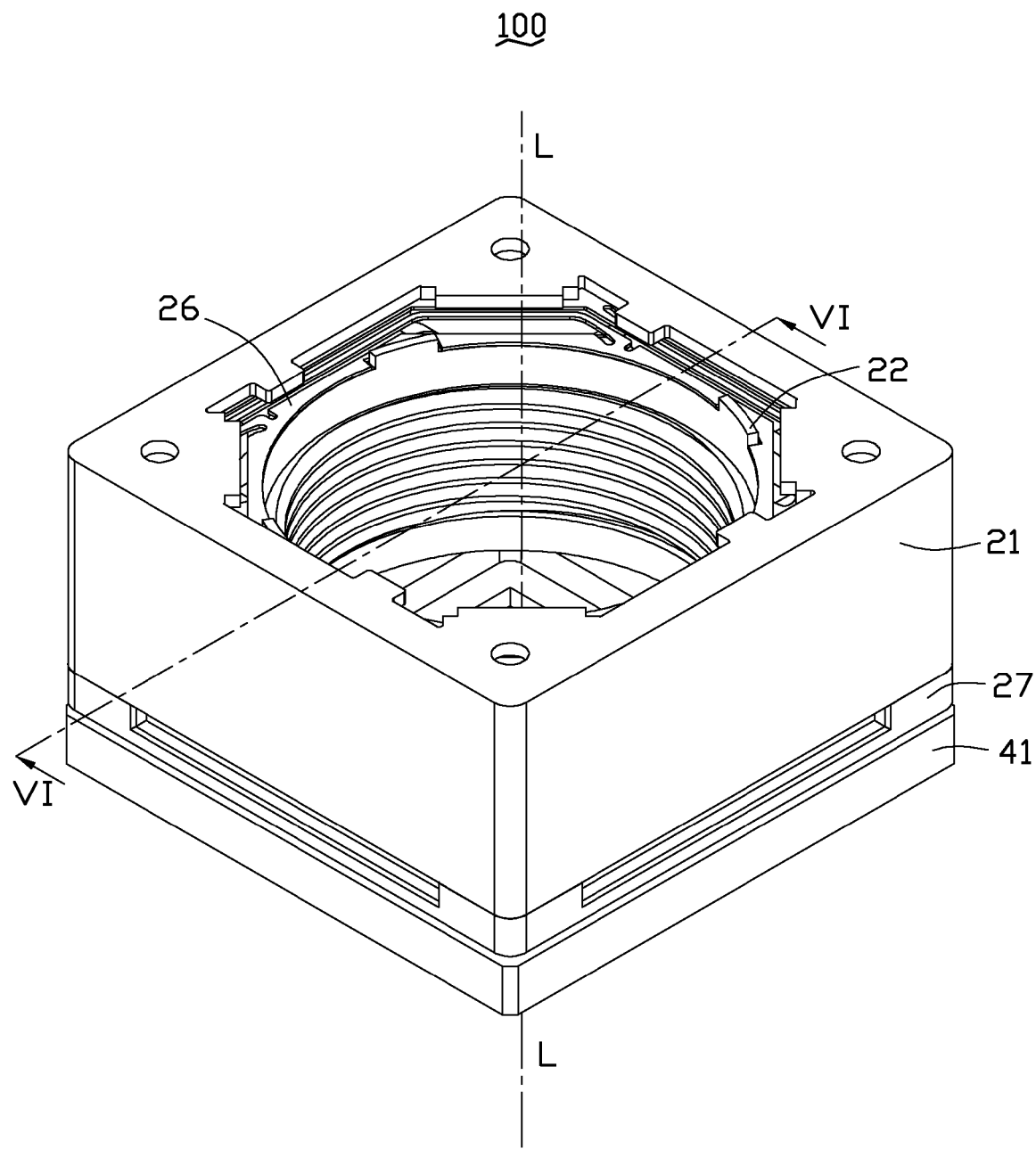
FIG. 5 is an assembled view of the lens module of FIG. 1.
Figure 6:
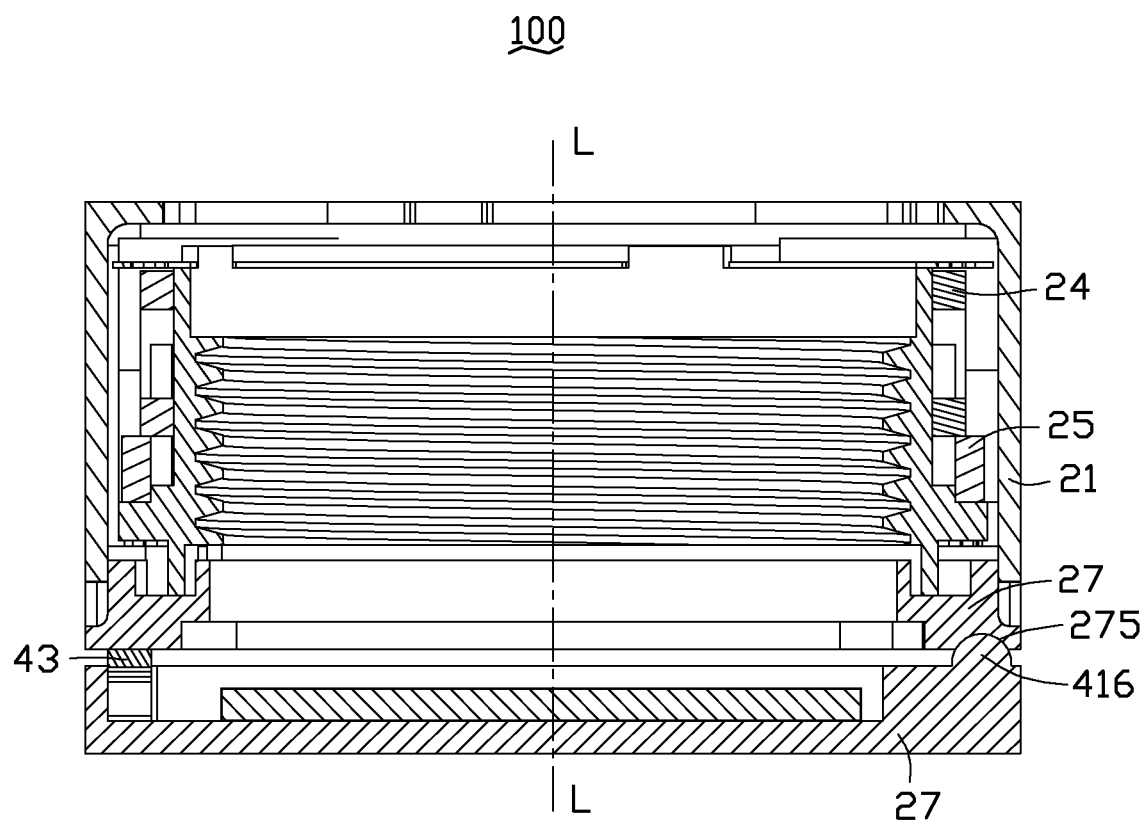
FIG. 6 is a cross-sectional view, taken along a line VI-VI of FIG. 5.

FIGS. 5-6, show the process of assembling the lens module 100, the VCM 20 is placed upon the image sensor module 40, and the guiding protrusion 416 of the seat 41 is received in the guiding hole 275 of the lower plate 27. As the guiding protrusion 416 is received in the guiding hole 275 and the lower plate 27 is supported on the supporting protrusion 431, the VCM 20 can be rotated around the guiding protrusion 416 in X-Z plane, X-Y plane or Y-Z plane. The lower plate 27 and the seat 41 are bonded together by glue after the lens received by the VCM 20 is aligned with the image sensor 42.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A voice coil motor (VCM), comprising:
   a case comprising an upper plate and a sidewall extending downward from peripheral edges of the upper plate, the upper plate and the sidewall cooperatively defining a receiving room;
   a moving barrel received in the receiving room;
   a magnet assembly comprising a plurality of magnetic elements, the magnetic elements received in the receiving room and surrounding the moving barrel; each of the magnetic elements comprising a first magnet and a second magnet staked on the first magnet; the first magnet comprising a first magnet surface facing an optical axis of the VCM, and the second magnet comprising a second magnet surface facing the optical axis; the first magnet surface having a magnetic pole different from a magnetic pole of the second magnet surface;
   a lower plate positioned on one end of the sidewall facing away from the upper plate;
   a first elastic plate connected between the upper plate and the moving barrel or between the lower plate and the moving barrel;
   a first coil assembly comprising a plurality of pairs of coils, the coils configured for driving the moving barrel to incline to a plane perpendicular to the optical axis, each pair of the coils opposite to each other and attached on the moving barrel; and
   a second coil assembly, the second coil assembly being annular shaped and sleeved over the moving barrel, for driving the moving barrel to move along the optical axis; wherein the first coil assembly is configured for stabilization and the second coil assembly is configured for focusing.

2. The VCM of claim 1, wherein the moving barrel comprises a first barrel portion and a second barrel portion connected to the first barrel portion at one end; the first barrel portion comprises an upper surface, a first outer surface, and a plurality of position blocks, the position blocks are adjacent to the upper surface and extend outward from the first outer surface in circumference, the first barrel portion defines a recess on the first outer surface in circumference adjacent to the second barrel portion, the first coil assembly is fixed on the position blocks, the second assembly is received in the recess.

3. The VCM of claim 2, wherein the first elastic plate comprises a first outer portion, a first inner portion, and a first connection portion connected between the first outer portion and the first inner portion; the first inner portion defines a plurality of first connection holes; the first barrel portion comprises a number of first connection blocks extending upward from the upper surface; the first outer portion is connected with the upper plate; the first inner portion is connected with the moving barrel via the first connection blocks receiving in the first connection holes.

4. The VCM of claim 3, further comprising a second elastic plate connected between the moving barrel and the lower plate.

5. The VCM of claim 4, wherein the second elastic plate comprises a second outer portion, a second inner portion, and a second connection portion connected between the second outer portion and the second inner portion; the second outer portion defines a plurality of second connection hole, the second inner portion defines a plurality of third connection hole; the lower plate comprises a first surface and a plurality of connection poles extending upward from the first surface; the second barrel portion comprising a second outer surface and a plurality of second connection blocks extending outward from the second outer surface in circumference; the connection poles are received in the second connection holes; the second connection blocks are received in the third connection holes.

6. The VCM of claim 5, wherein the upper plate defines a first through hole; the second barrel portion comprises a lower surface opposite to the upper surface; the lens barrel defines a lens hole extending through the upper surface and the lower surface; the lower plate comprises a second surface opposite to the first surface and defines a second through hole; optical axes of the first through hole, the lens hole, and the second through hole are collinear.

7. The VCM of claim 1, wherein each of the coils comprises a lower portion and an upper portion parallel to the lower portion; the lower portion adjacent to the lower plate faces the first magnet surface, and the upper portion adjacent to the upper plate faces the second magnet surface; the second coil assembly faces the first magnet surface.

8. A lens module, comprising:
   an image sensor module; and
   a voice coil motor (VCM) supported on the image sensor module, the VCM comprising:
      a case comprising an upper plate and a sidewall extending downward from peripheral edges of the upper plate, the upper plate and the sidewall cooperatively defining a receiving room;
      a moving barrel received in the receiving room;
      a magnet assembly comprising a plurality of magnetic elements, the magnetic elements received in the receiving room and surrounding the moving barrel; each of the magnetic elements comprising a first magnet and a second magnet staked on the first magnet; the first magnet comprising a first magnet surface facing an optical axis of the lens module, and the second magnet comprising a second magnet surface facing the optical axis; the first magnet surface having a magnetic pole different from a magnetic pole of the second magnet surface;

a lower plate positioned on one end of the sidewall facing away from the upper plate;

a first elastic plate connected between the upper plate and the moving barrel or between the lower plate and the moving barrel;

a first coil assembly comprising a plurality of pairs of coils, the coils configured for driving the moving barrel to incline to a plane perpendicular to the optical axis of the lens module, each pair of the coils opposite to each other and attached on the moving barrel; and a second coil assembly, the second coil assembly being annular shaped and sleeved over the moving barrel, for driving the moving barrel to move along the optical axis; wherein the first coil assembly is configured for stabilization and the second coil assembly is configured for focusing.

9. The lens module of claim 8, wherein each of the coils is annular shaped and comprises an upper portion and a lower portion parallel with the upper portion; the upper portion is opposite to the first magnet surface, and the lower portion is opposite to the second magnet surface.

* * * * *